United States Patent [19]

Williamson

[11] Patent Number: 4,787,129

[45] Date of Patent: Nov. 29, 1988

[54] METAL OF MANUFACTURING A COMPOSITE JOURNAL BUSHING

[75] Inventor: Robert L. Williamson, Fort Worth, Tex.

[73] Assignee: Dresser Industries, Inc., Dallas, Tex.

[21] Appl. No.: 628,178

[22] Filed: Jul. 6, 1984

[51] Int. Cl.$^4$ ............................................. B21D 53/10
[52] U.S. Cl. ........................... 29/149.5 C; 29/149.5 R
[58] Field of Search ................. 384/95, 279, 282, 902, 384/907, 912, DIG. 5, DIG. 9; 29/149.5 R, 149.5 PM, 149.5 C; 419/7

[56] References Cited

U.S. PATENT DOCUMENTS

| | | | |
|---|---|---|---|
| 2,168,301 | 8/1939 | Lemming et al. | 29/149.5 PM |
| 4,105,263 | 8/1978 | Sorensen et al. | 308/8.2 |
| 4,172,395 | 10/1979 | Keller | 76/108 A |
| 4,207,658 | 6/1980 | Sorensen | 29/149.5 PM |
| 4,402,617 | 9/1983 | McDowell | 384/95 |
| 4,456,577 | 6/1984 | Kawakita et al. | 419/7 |
| 4,466,165 | 8/1984 | Otto | 308/DIG. 5 X |

OTHER PUBLICATIONS

Keystone Carbon Co., Powder Metallurgy, 9-17-45, pp. 7 and 17-20.
"Introduction to Powder Metallurgy" by Joel S. Hirshhorn, American Powder Metal Institute, 1969, Second Printing 1976.
"Powder Metallurgy" by C. H. Samans, 1948 Edition of Metals Handbook (ASM).

*Primary Examiner*—Timothy V. Eley

[57] ABSTRACT

A method of manufacturing a composite plain bearing is shown comprising the steps of forming, through pressing and sintering of powdered-metal, a porous base member defining a bearing surface having a height greater than four times its wall thickness, disposing the porous member in intimate engagement with a backing member, and infiltrating an anti-galling metal alloy into the pores to substantially fill the pores and concomitantly braze the members into an integral unit, subsequent steps of finishing the integral unit prior to assembly as a bearing surface in a rock bit, include machining the I.D. and O.D. thereof, and heat treating to harden the base member.

6 Claims, 1 Drawing Sheet 4,787,129

METAL OF MANUFACTURING A COMPOSITE JOURNAL BUSHING

BACKGROUND OF THE INVENTION

1. Field of Invention

This invention relates to a sintered powder metal plain bearing having the pores thereof infiltrated with an anti-galling metal, and more particularly to such a bearing having a relatively thin wall powder metal component which is secured to and supported by a solid metal backing or shell.

2. Description of the Prior Art

U.S. Pat. Nos. 4,105,263 and 4,207,658, both of common assignee with the present invention, show a sintered powdered-metal bearing for a rock bit and a method of making it, respectively, wherein a metal alloy powder is compressed into the desired cylindrical shape for a journal bearing, providing a porous matrix approximately 85% dense, with the pores thereof being substantially in communication throughout. After pressing and sintering such cylindrical member, the pores are infiltrated with an anti-galling material such as silver-manganese alloy to provide a premium rock bit journal bearing having, at the bearing surface, alternating areas of alloy steel and silver-manganese providing strength and lubricity for the bearing surface.

It is thus apparent that the silver-manganese anti-galling infiltrating material comprises, by volume, approximately 15% of the powdered-metal bearing structure but is effective for lubricity only at the bearing surface. In that this material is relatively expensive because of its silver content, it has been determined that a substantial cost reduction could be obtained by limiting the wall thickness of the bearing. However, it is accepted practice in powder metallurgy compaction that, in order to produce uniformly dense powder metallurgy parts, even when using a double acting press, the configuration of pressed powder metal parts is to have a height (in this instance, the axial dimension) no greater than a factor of four times the wall thickness. Otherwise, it has been found that the central portion of the height of the pressed part was less dense than either end portion, giving the part a non-uniform strength, generally unsuitable for high load and stress conditions such as encountered in rock bit bearing applications.

U.S. Pat. No. 4,172,395, likewise of common assignee, shows a technique and structure for making a relatively thin walled sintered powdered-metal bearing for a rock bit wherein the powdered-metal bushing is formed and compacted in situ in a recess in the bearing cavity of the cone cutter and, during sintering, adheres to the base metal of the cone. The pores thereof are subsequently filled with an anti-galling material and the bearing is then hardened in accordance with the typical treatment for finishing the sintered bushing. Such method has never been commercially acceptable because of the manufacturing problems for such in situ formation. Further, it would require compaction with a single action press resulting in the axially innermost half of a bushing of the necessary axial extent (i.e. height), being considerably less dense than the outer half, again resulting in non-uniform strength and likely early failure.

U.S. Pat. No. 4,402,617, again of common assignee, discloses yet another thin walled sintered powdered metal bushing for a rock bit wherein the bushing is formed and infiltrated prior to it being seated in interfering engagement within a bearing shell and wherein the structure on the bearing shell in cooperation with structure in the bearing cavity of the cone captures the bushing so that it cannot be displaced during the extreme forces encountered in a rock bit. As contemplated by this invention, although not stated explicitly, the powdered-metal bushing was first compacted with a wall thickness consistent with powder metallurgy technology (i.e. a height to depth ratio less than 4) to obtain consistent uniform strength throughout, then after sintering, filled with the anti-galling metal to provide a machinable structure, and then machined to the thin-walled configuration shown, capturing for recycling, the infiltrant of the machined-away material.

Journal bearings for a rock bit made according to the latter patent have not been commercially available because of either the above manufacturing complexity and expense and the potential for assembly errors (i.e. it is apparent from FIG. 2 of this patent that the assembly of the bushing could be reversed such that such thin wall bushing could be positioned adjacent the O-ring and thereby not axially retained).

It is well known that the silver-manganese alloy which has been commercially used as the anti-galling metal infiltrated into the powder metal sintered bushing described in the above patents was initially developed as a brazing compound exhibiting, in its molten condition, a great affinity to flow between closely fitting adjacent faces by capillary action and also forming nominal fillets yet having sufficient flow resistance to prevent flow completely out of the brazed joint. Because of these characteristics and the inherent premium anti-galling properties of the silver it came to be used, as is made apparent in the identified patents, as an infiltrant for the powdered-metal bushings therein discussed. However, in this regard, it is also known that when the silver-manganese is infiltrated into the porous powdered metal base material from one surface of said material, continued heating of the base material and the silver-manganese until the base material is completely filled, causes the silver-manganese adjacent the surface from which the infiltration occurred to segregate into a predominantly manganese layer. This high manganese layer, when subject to subsequent heat treatment, as is required in finishing the base material for use as a bushing, results in the corresponding layer of the base material being converted to a stable Austenite phase which is inherently soft and not responsive to thermal treatment. Thus, to accommodate this phenomenon, additional base material or stock was required for such layer, which was then subsequently machined away to expose a lower portion of the base prior to further thermal treatment of the bushing.

SUMMARY OF THE INVENTION

The present invention provides a thin wall powder metal sintered bushing which contrary to established powdered metallurgy compaction practice, is fabricated initially as a thin wall member (i.e. having a height greater than 4 times the wall thickness and, in fact, on the order of 12 times the wall thickness.) Sufficient uniformity in strength is obtained by filling the pores of the powdered metal base with an anti-galling metal alloy infiltrant and backing the member with a solid metal shell. In particular, the anti-galling material is infiltrated into the powdered metal bushing after the bushing is interferringly seated within the shell such that the silver-manganese material brazes the solid backing member to the porous bushing member at the same time the bushing is infiltrated thereby providing an integral unit of generally uniform strength. Further the material is infiltrated into the porous bushing from a surface other than the actual bearing surface and eliminates the necessity of machining the manganese segregated layer, and stock prior to further thermal treatment of the powdered metal part. Other typical machining and heat treating operations, as described in U.S. Pat. No. 4,207,658 complete the fabrication process.

DESCRIPTION OF THE PREFERRED EMBODIMENT

Figures 1, 2:
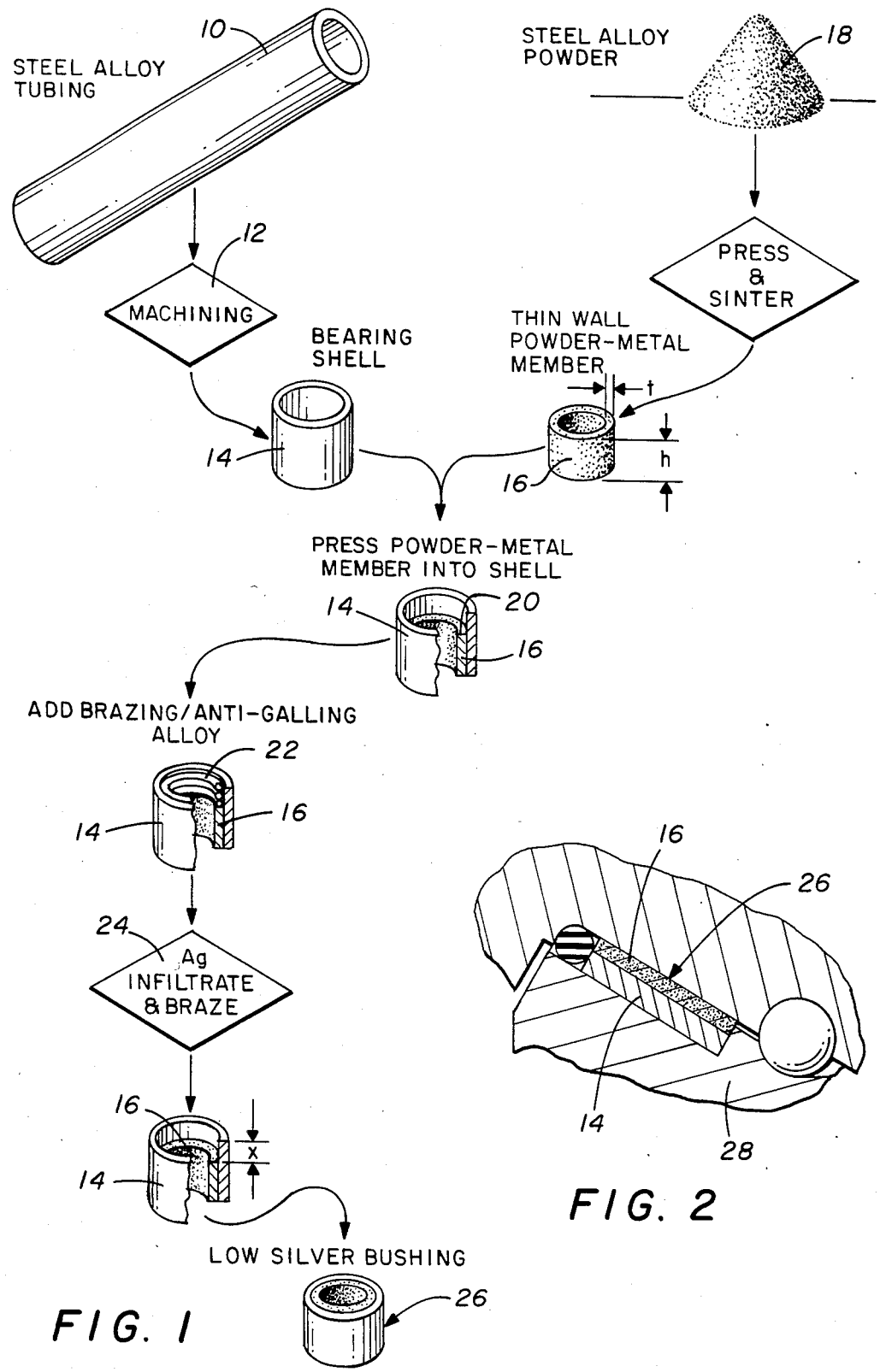
FIG. 1 is a schematic process flow diagram illustrating the method steps for forming the composite assembled bushing according to the invention; and, FIG. 2 is a partial cross sectional view of the assembled bushing as inserted into the bearing cavity of a rock bit cutter.

Referring to FIG. 1, the schematic process flow chart therein shown illustrates the fabrication of the hardback, powder-metal sintered bushing infiltrated with an anti-galling material that additionally brazes the bushing to the hardback shell. It should be understood at the outset that although the thin wall bushing therein illustrated forms the I.D. of a cylindrical bushing member, with the hardback bearing shell forming the O.D. of the composite bearing, it could just as well be reversed with the bearing shell providing the I.D. and the thin wall bushing forming the bearing O.D.

Initially a stock steel alloy such as AISI 8620 tubing 10 is cut to an appropriate axial dimension and the I.D. and O.D. thereof are machined as at 12 to appropriate dimensions respectively, forming a bearing shell 14.

A powdered-metal sintered cylindrical bushing is formed by pressing a powdered steel alloy 18 at room temperature into a cylindrical member of a predetermined size (to be discussed later) and sintered at approximately 2050° F. to form an integral porous bushing. However, contrary to previous powder metallurgy compaction practice, the height (or axial dimension) h of the bushing, in this instance is greater than four (4) times the wall thickness t and in fact, on the order of 12 times the thickness (i.e. h=12t). Thus, the powder metal structure of such relationship is hereafter referred to as a thin wall structure. Although a resultant lower density is produced in the center of the thin wall structure, for reasons to be described later, the structure is made sufficiently uniformally strong to permit such thin wall fabrication technique to form a bearing structure.

It is herein pointed out that the thin wall powder metal member 16 is approximately 85% dense (by volume) leaving an approximately 15% void therein to be filled by the silver-manganese anti-galling alloy material.

The fabrication of the thin wall powder metal member 16 can be done at sufficiently close tolerances so that no machining is required and thus, the member 16, after being formed, is pressed into the bearing shell 14. For this purpose there is a slight interference fit (i.e. on the order of 0.002 in. on the diameter) to obtain a positive engagement between the opposed faces of the bearing shell 14 and the O.D. of the powder metal member 16. However, it should be pointed out that because the sintered bushing is essentially in an annealed condition, the interference fit should not be so great as to cause the pores at the outer surface of the powder metal member 16 to be closed or collapsed during the pressing operation which would prevent flow of the brazing/anti-galling silver-manganese material to this interface. However, the above-mentioned interference is acceptable.

Also, the axial length of the bearing shell 14 is seen to be somewhat longer than the axial length of the powder metal member 16 so that when pressed together until flush at one end, such additional length provides a countersunk ridge or shoulder 20 formed on the opposite end by one axial end of the member 16 to support a coil wire 22, thereon of the silver-manganese brazing/anti-galling metal alloy with the increased length being sufficient to support and enclose the height of the coil necessary to fill the 15% void in the powder metal member 16. The assembled bearing shell 14, member 16 and silver-manganese wire 22 are then heated to approximately 1800° to 1850° F. while maintaining it in the orientation shown. The silver-manganese has a melting temperature of about 1760° F. and a flow temperature of about 1780° F. with the excess heat supplied increasing the rate of the infiltration process. Under such heated conditions, the wire melts and by gravity and capillary action flows into the pores and between the interface of the bearing shell 14 and the powder metal member 16 to simultaneously fill the pores of the member 16 and braze it to the bearing shell 14. Filling the pores of member 16 with the metal alloy and brazing the member 16 to the backing shell 14, forms an integral bearing unit having sufficiently uniform strength throughout for use as a bearing element after subsequent heat treating steps as identified in the co-owned U.S. patents.

Heretofore, as previously explained, the powdered-metal member was infiltrated with the silver-manganese anti-galling material by placing the anti-galling material adjacent the surface forming the I.D. thereof. Thus, during infiltration the manganese segregation phenomenon occurred adjacent the surface into which the silver-manganese flowed. Subsequent machining of the I.D. surface was then required to a depth sufficient to clear the bushing I.D. from this manganese segregation (i.e. on order of 0.080 inches on diameter) requiring the removal of stock (which had previously been provided particularly for this purpose) along with the more expensive silver-manganese material which, although recoverable, added to the expense of the fabrication of the bushing.

In the present invention, after the infiltration/brazing process as at 24, the excess axial length x of the bearing shell 14 is removed to form the integral composite bushing 26 but no machining is required to remove the segregated manganese from the end of the bushing 26 (and thus no additional sacrificial stock is originally required).

Further steps in completing the bushing and the assembly thereof in the cone cutter, although not illustrated in FIG. 1, includes rough machining the I.D. and O.D. of the composite bushing 26. Thereafter, the composite bushing 26 is heat treated (i.e. quenched and tempered) according to prior powder metal sintered bushing fabrication practice, and the O.D. of the composite bushing (the outer surface of the bearing shell) is finish machined.

With the O.D. of the bushing 26 machined to the proper diameter, the composite bushing is assembled into the bearing cavity of the cone 28 as is shown in FIG. 2. The I.D. of the cone cavity, now including the I.D. of the bushing 26, is then ground to the final finish, completing the assembly of the bushing 26 within the bearing cavity of the conical cutter 28.

Thus, it is seen that an infiltrated bushing is provided having a thin wall powder metal component brazed to a hardback shell and, which can be assembled within the cone cavity without concern for proper orientation. The powder metal component provides the bearing surface and is infiltrated with the anti-galling material simultaneously with brazing the member to the bearing shell. Further from this it is apparent that the silver-manganese antigalling/brazing alloy is infiltrated only into the thin wall powdered-metal member 16, thereby reducing the silver content from the prior art commercially available bushing, which was formed completely of a powdered-metal sintered material, by about 55% and in a manner that does not require subsequent machining of sacrificial stock prior to further thermal treatment of the bushing. Also, using AISI 8620 alloy as a hardback shell, increases the mechanical strength (i.e. flexure and impact strength) over the previous all powdered-metal bushing.

I claim:

1. A method of manufacturing a composite journal bearing defining a first member of an axial height having a bearing surface and an opposite surface at a desired wall thickness therebetween and a second member, generally co-extensive with said opposite surface and attached to said opposite surface to provide a backing for said first member comprising the steps of:
   forming, through pressing and sintering of powdered steel alloy, said first member having communicating pores generally throughout and having, as formed, a height to wall thickness ratio greater than 4;
   providing a metal backing member in intimate engagement with said opposite surface of said first member;
   infiltrating an anti-galling molten metal alloy into said pores to substantially fill said pores and concomitantly brazing said members into an integral unit from a surface on said first member other than said bearing surface; and,
   finishing said integral unit prior to assembly as a bearing by appropriate machining and heat treating.

2. The method of claim 1 wherein said powdered steel alloy sintered member has, as formed, a height to wall thickness ratio on the order of 8.

3. The method of claim 1 wherein said backing member extends beyond one end of said sintered member and said infiltrating brazing step comprises:
   orienting said sintered member and said backing member in intimate engagement and with said extending portion generally vertical and extending above one end of said sintered member; and,
   placing an amount of solid anti-galling alloy on said end as supported by said extension, said amount being sufficient to completely fill said pores and braze said members together; and,
   heating said unit and anti-galling alloy until said anti-galling alloy is molten whereby it flows by a gravity and capillary action into the pores of said sintered member and between the engaging faces of said members to, upon cooling, fill the pores and braze the members together.

4. The method according to claim 3 wherein said appropriate machining and heat treating includes removing said extending portion of said backing member.

5. The method of claim 4 wherein said step of disposing said first and second members in intimate engagement includes the steps of:
   forming said first member into a cylindrical shape having a bearing surface at one diameter and an opposite surface at a second diameter;
   providing a cylindrical backing member with an engaging surface at a predetermined diameter so as to engage said opposite surface of said sintered member at a slight interference fit.

6. A method of claim 5 wherein said interference fit does not exceed 0.002 inches on the diameter of said cylindrical members so that the pores on said interfering surface of said sintered member are not smeared shut upon assembly of the two members in said interfering engagement.

* * * * *